S. S. THOMAS.
COTTON PICKING MACHINE.
APPLICATION FILED FEB. 25, 1909.
948,619.
Patented Feb. 8, 1910.
3 SHEETS—SHEET 1.
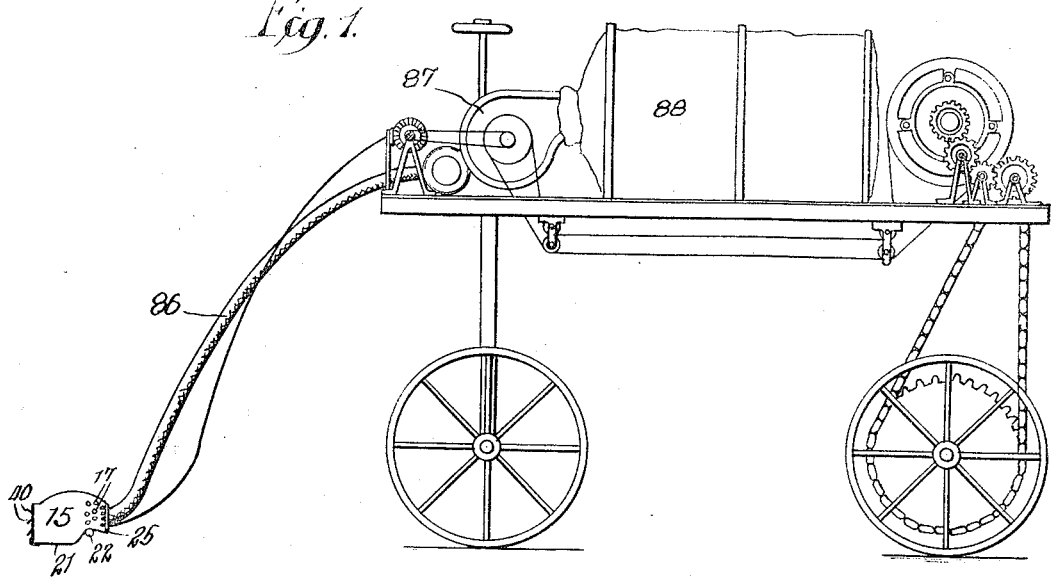
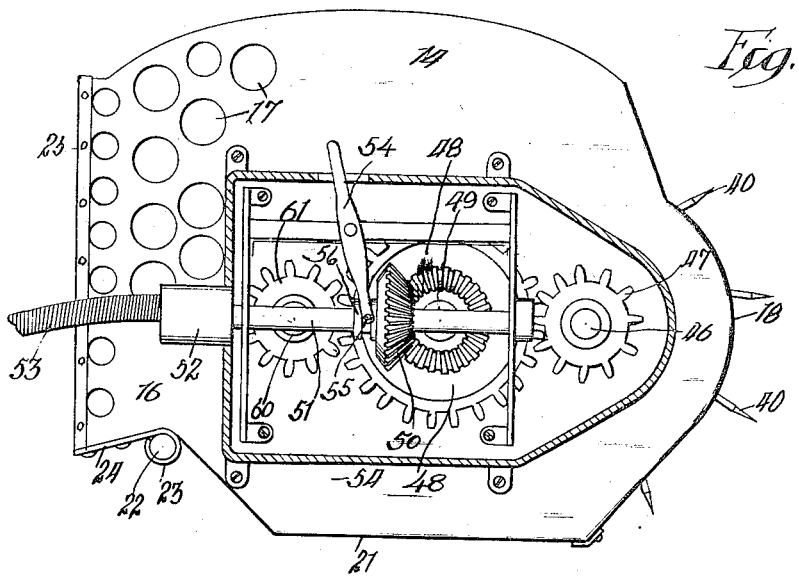
Witnesses:
Inventor:
Stephen S. Thomas.
by
Attys.

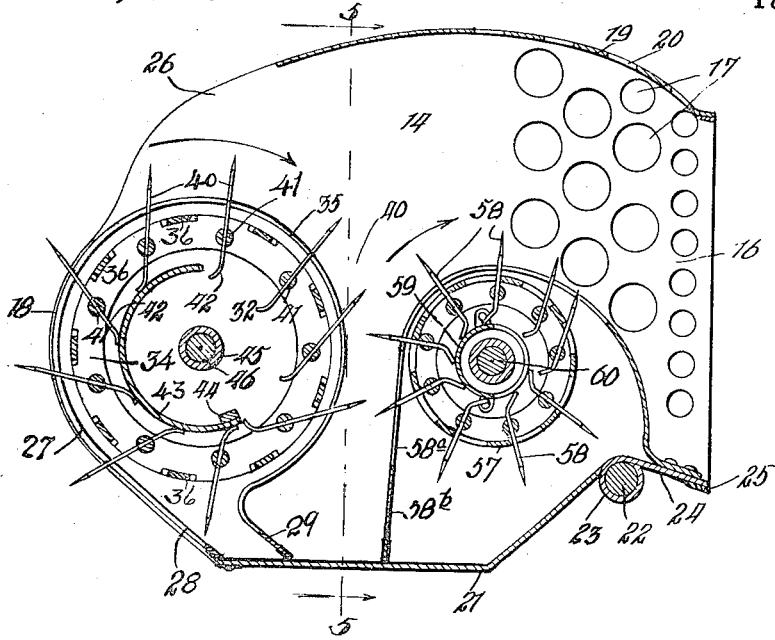

S. S. THOMAS.
COTTON PICKING MACHINE.
APPLICATION FILED FEB. 25, 1909.
948,619.
Patented Feb. 8, 1910.
3 SHEETS—SHEET 3.
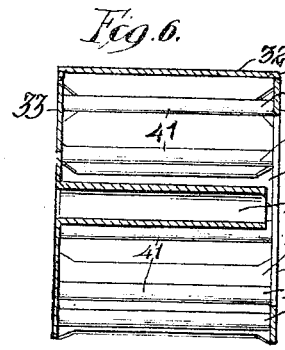
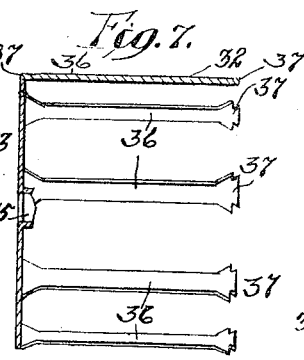
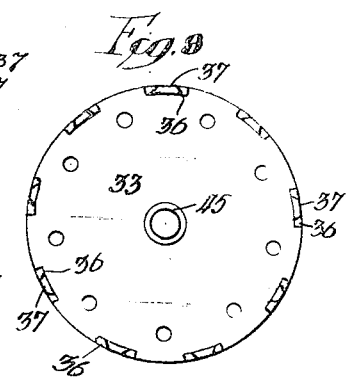
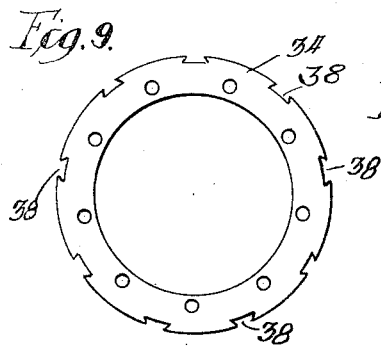
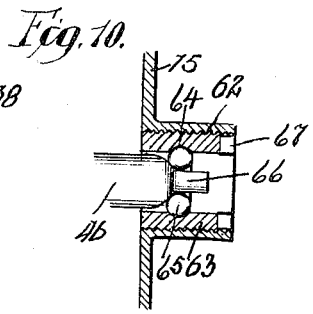
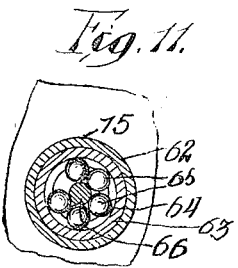
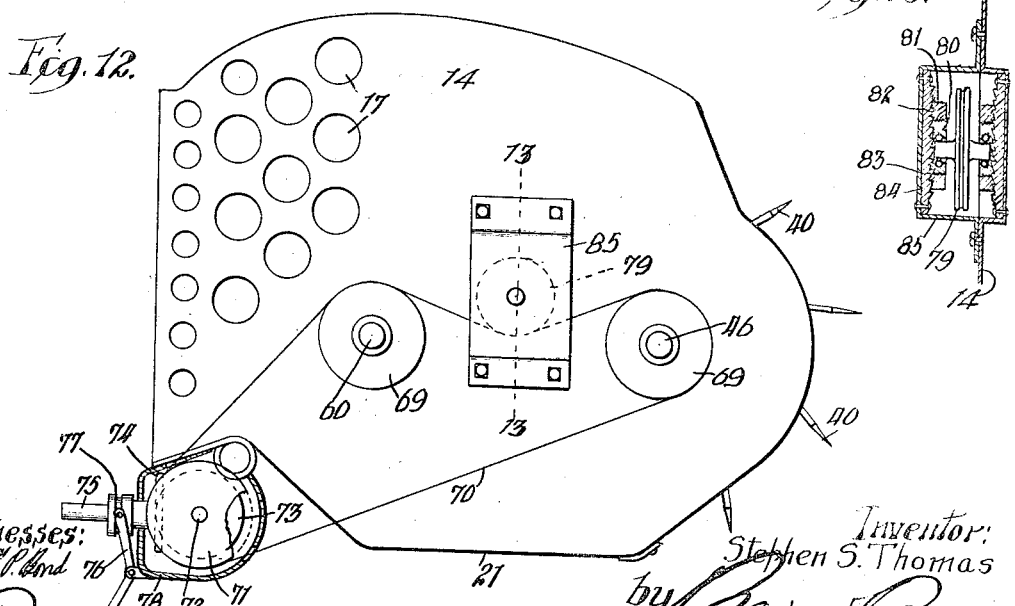
Inventor:
Stephen S. Thomas

UNITED STATES PATENT OFFICE.

STEPHEN S. THOMAS, OF GULFPORT, MISSISSIPPI.

COTTON-PICKING MACHINE.

948,619.	Specification of Letters Patent.	Patented Feb. 8, 1910.

Application filed February 25, 1909. Serial No. 479,959.

*To all whom it may concern:*

Be it known that I, STEPHEN S. THOMAS, a citizen of the United States, residing at Gulfport, in the county of Harrison and State of Mississippi, have invented certain new and useful Improvements in Cotton-Picking Machines, of which the following is a specification.

This invention relates to cotton pickers which combine mechanical and pneumatic means for picking and conveying the cotton from the cotton bolls to the bag or receptacle intended to receive the cotton. In devices of this kind, it is customary to drive or move the picking machine along the rows of cotton and in position for a number of attendants to manipulate the picker heads and bring them into position to pull out the cotton from the bolls in condition to be thereafter sucked up through a flexible tube into the receptacle. In certain prior constructions it has been difficult to pull out the cotton fibers without, at the same time, carrying up particles of twigs or dead leaves, which, mingling with the cotton, tend to entangle the cotton fibers and are a source of great inconvenience and loss.

The object of the present invention is to so arrange the picker heads that the cotton will be mechanically picked out from the bolls without displacing the leaves or twigs, and thereafter carried into the casing of the picker head, drawn off from the teeth of the picker without entanglement, and in position to be readily drawn up the tube by suction, the air being drawn off through the casing or the picker head at such a point that the suction will not affect the twigs or leaves which might otherwise be sent up with the cotton.

The invention relates to the construction of the toothed picker drum and the discharging drum; to the slotted shields which coöperate therewith; to the mountings for the drums; to the driving mechanism therefor; and to the construction and arrangement of the picker head as a whole and the individual parts thereof.

Further objects will appear from a detailed description of the invention, which consists in the features of construction and combination of parts hereinafter described and claimed.

In the drawings, Figure 1 is a side elevation of the entire machine, showing one of the picker heads; Fig. 2 an enlarged side elevation of the picker head, showing the gear housing in section; Fig. 3 a sectional elevation, taken through the center of the casing and showing the drums in section; Fig. 4 a front elevation of the picker head; Fig. 5 a cross sectional view, taken on line 5—5 of Fig. 3, looking inwardly; Fig. 6 a sectional view through the axis of the picker drum; Fig. 7 a similar view, showing the picker teeth and mountings therefor removed; Fig. 8 an end elevation of one end of the drum; Fig. 9 an end elevation of the opposite end of the drum; Fig. 10 a detail, showing the ball bearing mounting for the drum shaft; Fig. 11 a cross sectional view of the same; Fig. 12 a modification, showing the use of a belt in place of a gearing; and Fig. 13 a cross sectional view, taken through line 13—13 of Fig. 12.

The mechanism of the picker head is located within a casing comprising side walls 14 and 15, each of which consists of a neck portion 16 provided with air inlet openings 17 and an outwardly rounded front portion 18. The side walls are connected by means of a top cross wall 19 having air inlet openings 20. The lower portion of the casing is closed by means of a door 21 which is hinged to a pintle 22 entered through a loop 23 formed on the forward end of a cross bar 24. The rear end of the casing is surrounded by a reinforcing frame 25, which is riveted or otherwise secured to the walls of the casing. The front end of the casing is open at its upper portion to provide an inlet mouth 26 immediately above a slotted shield 27, which is in the form of a metal plate of cylindrical formation, save at its lower portion, at which point the outer and inner ends 28 and 29 of the shield are downwardly bent and provided with ears 30 entered through the side walls of the casing, as best shown in Figs. 3 and 4. The shield, in the form shown in Fig. 4, is provided with four circumferential slots 31 which extend from end to end of the metal plate in which the shield is formed, save only at the attaching ends which are left integral for the purpose of affording sufficient rigidity to prevent collapse of the circumferential portion of the slotted shield. Within the slotted shield is located a picker drum 32, which comprises a solid drum head 33 at one end and a ring-shaped drum head 34 at the other end, connected by means of a series of cross tie bars 36, the ends of which abut against the cylinder heads and are provided with outwardly extending tongues or tenons 37, which project through mortised recesses 38 around the peripheries of the drum heads, as shown in Fig. 9, which arrangement affords a rigid open drum and one well adapted to withstand the strain of actual usage. The slots in the picker shield serve to permit of the outward projection of picker teeth 40 which are arranged in series of four, each series being carried by a rock shaft 41, the ends of which are journaled within holes in the cylinder heads. Each row of four pins is arranged to have two of the pins inwardly projected to form feet 42 which are adapted to ride upon a circular track 43 in the form of a curved spring plate which extends concentrically with the drum and on the inside thereof, which track is broken away, at its rear side, to allow the teeth to swing as they ride off from the trackway at this point. The circular trackway, at one end only, is rigidly secured to and supported on a stud or post 44, which gives to the free end considerable resiliency or spring action, and the stud or post 44 extends inwardly from the side wall 14 of the casing through the end of the drum. The arrangement is one which holds the teeth forwardly projected during the time they are in picking position, as indicated to the left in Fig. 3, and allows the teeth to swing free while in delivering position, as shown to the right in Fig. 3. Furthermore, the swinging movement of the teeth will be limited by the cross bars 36 with which they are adapted to contact when swung to their limit of movement.

The solid head 33 of the drum has inwardly projecting therefrom and rigidly secured thereto a sleeve 45 which is splined onto a shaft 46 carrying at one end a spur pinion 47 meshing with a driving spur gear 48 connected with a driven bevel pinion 49 in mesh with a driving bevel pinion 50, which is slidably splined on a horizontally driving shaft 51 passing through a journal bushing 52, and is adapted to be connected with a flexible shaft 53. The driving bevel pinion 50 is adapted to be thrown into and out of mesh with the driven bevel pinion 49 by means of a pivoted lever 54, which is forked at its end 55 to engage a grooved collar 56 which forms the hub of the driving bevel pinion 50.

The picker drum co-acts with a discharging drum 57 of considerably smaller size, which is located in the same horizontal plane as the picker drum and to the rear thereof. The structural features of the discharging drum are similar in all respects to those of the picker drum, so that it is not deemed necessary to enter into a detailed description thereof. The picker drum is provided with rows of teeth 58 arranged in series of four, which teeth, as shown in Figs. 3 and 5, are spaced to pass inside of the companion teeth on the picker drum with which they coöperate. That is, two middle teeth on the discharging drum will pass between two middle teeth on the picker drum, and two outer teeth on the discharging drum will pass inside of two outer teeth on the picker drum. The inwardly projecting feet on the teeth 58 are adapted to ride over a rigidly supported curved track 59, similar in general arrangement to the circular track 43 except as to size and resiliency, the track being proportionate to the reduced size of the discharging drum as compared with the picker drum. The amount of projection of the teeth, however, is substantially the same in the two drums. The teeth 58, when in acting position, project through slots 58$^a$ in a comb 58$^b$ which extends over the top of the discharging drum, being connected, at its ends, by ears 58$^c$ projecting through the side walls of the casing. The two slotted shields approach closely together, sufficient space only being allowed for the passage of the teeth. The discharging drum is splined onto a shaft 60 provided, on its end, with a spur pinion 61 equal in size and shape to the spur pinion 47, and like said pinion meshing with the driving spur gear 48. The ends of the shafts 46 and 60 are entered through inwardly threaded collars 62 which have screwed thereinto bearing blocks 63 provided with runways 64 adapted to receive balls 65 which bear against the reduced end 66 of the shaft. The bearing block is provided, at its end, with a slot 67 adapted to be engaged by a screw driver for adjusting the collar and regulating the pressure on the balls. It will be understood that each of the shafts is mounted in the manner described, and that the ends of the shafts which receive the pinions are extended through their openings sufficiently to provide a mounting therefor.

Figs. 12 and 13 illustrate a slightly different arrangement as regards the driving mechanism. In place of the spur pinions and driving gear, each of the shafts is provided with a grooved pulley 69 which receives an endless belt or cord 70 which travels around an endless driving pulley 71 mounted on a shaft 72, which has also mounted thereon a friction disk 73 adapted to be engaged by a friction driving disk 74 on the end of a stub shaft 75 to which the flexible shaft is attached. A forked lever 76 engages a grooved collar 77 and serves to move the stub shaft back and forth and with it the driving friction disk. The parts above described are mounted within a housing 78 located under the neck of the casing. The belt or cord 70 passes under an idler tension pulley 79 which is carried in ball bearing mountings 80 screwed into blocks 81, which blocks are provided with teeth 82 adapted to engage with teeth 83 on the inner faces of side plates 84. The side plates 84 are secured to the side walls of a box 85 which is set into the side wall of the casing. The box is formed of two sections, and in order to adjust the vertical height of the tension pulley the outer section of the box is removed and the position of the toothed blocks 81 adjusted, after which the outer section of the box is restored, thereby causing the teeth of the blocks 81 to engage with the teeth of the plates 84 for holding the parts in adjusted position.

The picker head is secured to a flexible conveyer tube 86, through which the cotton on the carrier is adapted to be carried by the action of a blower 87 and deposited within a receptacle 88. The details of the blower and method of pneumatically conveying the cotton are too well understood to require explanation.

In use, the picker head is manipulated by hand in position to bring the forward end thereof into close proximity to the cotton bolls, from which the cotton fiber is drawn out by the engagement of the teeth, which, at this point in their revolution, are held in a forwardly projecting manner by the engagement of the feet of each row of teeth with the curved track. It is preferred to have the feet of adjacent rows of teeth inwardly projected from the teeth lying in different planes, so that, in swinging back and forth, the feet may not interfere with one another. As the cotton is pulled out of the bolls, it will be carried over the picker drum and in contact with the slotted shield through which the teeth project, which slotted shield prevents entanglement of the cotton with the movable parts of the drum, and as the loaded teeth of a single row approach the innermost point in their line of travel the feet of such row will swing clear of the curved track, which allows the teeth to assume a position most favorable for the discharge of the cotton, which will be effected by the action of the teeth on the discharging drum, which engage the cotton and pull it off of the picker teeth, which latter, as the cotton is being pulled off, will swing into parallelism with the line of travel of the cotton and allow the load of cotton to slip off without binding or cramping. The cotton thus pulled off from the picker teeth will be carried up and over the inner shield until it reaches a position adjacent to the air holes through which air is drawn and the suction commences. The inner shield, at this point, is curved to recede from the periphery of the discharging drum, so that the teeth of the latter will be drawn down through the slots in the shield, and during this period of their travel they will be free to assume a position most favorable to the discharge of the cotton which will be held against the top of the shield as the teeth are drawn away therefrom. The arrangement is one which carries back the cotton without danger of its entanglement with the working parts of the picker head, and discharges it at the point most favorable for its further conveyance by pneumatic means. By locating the air holes immediately to the rear of the discharging drum, the influence of the suction will not be felt at the forward or picking end of the picker head, so that twigs, leaves or other refuse will not be drawn into the machine to become entangled with the cotton, which is a matter of the greatest importance in the art to which the present invention relates. The curved track against which the feet of the picker teeth abut is sufficiently resilient to permit the teeth, especially as they approach the free end of the track, to depress the track sufficiently to permit reversal of the teeth in case they become entangled with twigs or refuse, thereby preserving the teeth against serious injury. At the same time the bar 44 which supports the lower end of the track affords a rigid abutment for throwing the teeth into picking position.

The arrangement is one which combines, in the highest degree, the advantages of a pneumatic conveyer, such as lightness, portability, and ease of manipulation, with the certainty and perfection of operation of mechanical picking mechanism; and the parts are assembled and combined with sufficient compactness to permit the picker head to be easily manipulated by hand, which is essential in the successful picking of cotton.

What I regard as new and desire to secure by Letters Patent is:

1. In a cotton picking machine, a picker head comprising a casing, a picker drum rotatably mounted within the casing and provided with teeth, a slotted shield through which the teeth project, a discharging drum rotatably mounted within the casing to the rear of the picker drum and provided with teeth, a slotted shield through which the teeth project, and pneumatic means for conveying the cotton from the last mentioned shield substantially as described.

2. In a cotton picking machine, a picker head comprising a casing, a picker drum rotatably mounted within the casing and provided with teeth, a slotted shield through which the teeth project, means for removing the cotton from the teeth, the casing being provided with an air inlet opening to the rear of the picker drum, a pneumatic conveyer tube connecting with the picker head, and means for creating a suction through the inlet opening and through the tube, substantially as described.

3. In a cotton picking machine, a picker head comprising a casing, a picker drum rotatably mounted within the casing and provided with teeth, a slotted shield through which the teeth project, a discharging drum rotatably mounted within the casing to the rear of the picker drum and provided with teeth, a slotted shield through which the teeth project, the casing being provided with an air inlet opening to the rear of the picker drum, a pneumatic conveyer tube connecting with the picker head, and means for creating a suction through the inlet openings and through the tube, substantially as described.

4. In a cotton picking machine, the combination of a pneumatic conveyer tube and a picker head connected therewith and comprising a casing provided, to the rear of its intake mouth, with an air inlet opening, a picker drum rotatably mounted in front of said opening and provided with pivoted teeth adapted to project forwardly from the casing, means for holding the teeth rigid in their picking position and adapted to release the teeth in discharging position, and a slotted shield through which the teeth project, substantially as described.

5. In a cotton picking machine, the combination of a pneumatic conveyer tube and a picker head connected therewith and comprising a casing provided, to the rear of its intake mouth, with an air inlet opening, a picker drum rotatably mounted in front of said opening and provided with pivoted teeth adapted to project forwardly from the casing, means for holding the teeth rigid in their picking position and adapted to release the teeth in discharging position, a slotted shield through which the teeth project, a discharging drum to the rear of the picker drum provided with pivoted teeth, means for holding said teeth rigidly when in proximity to the picker teeth and adapted to release said teeth when in discharging position, and a slotted shield through which the teeth of the discharging drum project, substantially as described.

6. In a cotton picking machine, a picker head comprising a casing, a picker drum rotatably mounted in said casing and provided with pivoted teeth adapted to project forwardly from the casing, means for holding the teeth rigid in their picking position and adapted to release the teeth in discharging position, a slotted shield through which the teeth project, a discharging drum to the rear of the picker drum provided with teeth, means for holding said teeth rigidly when in proximity to the picker teeth and adapted to release said teeth when in discharging position, and a slotted shield through which the teeth of the discharging drum project, substantially as described.

7. In a cotton picking machine, the combination of a casing, a picker drum rotatably mounted therein and comprising at one end a solid drum head and at the other end a ring-shaped drum head, a sleeve inwardly projecting from the solid drum head, a shaft to which said sleeve is rigidly secured, a curved track in the form of a plate secured to one of the walls of the casing and inwardly projecting into the open end of the drum, and teeth pivoted within the drum and provided with feet adapted to engage the curved track during a portion of their revolution, for holding the teeth in rigid position, substantially as described.

8. In a cotton picking machine, the combination of a casing, a picker drum rotatably mounted therein and comprising at one end a solid drum head and at the other end a ring-shaped drum head, a sleeve inwardly projecting from the solid drum head, a shaft to which said sleeve is rigidly secured, a curved track in the form of a plate secured to one of the walls of the casing and inwardly projecting into the open end of the drum, rock shafts having their ends journaled in the heads of the drums, and teeth arranged in rows and rigidly secured to the rock shafts, one of the teeth of each row being inwardly elongated to provide a foot adapted to engage the curved track during a portion of the revolution of the drum and adapted to be released from the track when the teeth are brought to discharging position, substantially as described.

9. In a cotton picking machine, the combination of a casing, a picker drum rotatably mounted therein and comprising at one end a solid drum head and at the other end a ring-shaped drum head, a sleeve inwardly projecting from the solid drum head, a shaft to which said sleeve is rigidly secured, a curved track in the form of a plate secured to one of the walls of the casing and inwardly projecting into the open end of the drum, rock shafts having their ends journaled in the heads of the drums, teeth arranged in rows and rigidly secured to the rock shafts, one of the teeth of each row being inwardly elongated to provide a foot adapted to engage the curved track during a portion of the revolution of the drum and adapted to be released from the track when the teeth are brought to discharging position, and a discharging drum, similarly constructed and having teeth similarly mounted and actuated, substantially as described.

10. In a cotton picking machine, the combination of a casing, a picker drum rotatably mounted therein and comprising at one end a solid drum head and at the other end a ring-shaped drum head, a sleeve inwardly projecting from the solid drum head, a shaft to which said sleeve is rigidly secured, a curved track in the form of a plate secured to one of the walls of the casing and inwardly projecting into the open end of the drum, rock shafts having their ends journaled in the heads of the drums, teeth arranged in rows and rigidly secured to the rock shafts, one of the teeth of each row being inwardly elongated to provide a foot adapted to engage the curved track during a portion of the revolution of the drum and adapted to be released from the track when the teeth are brought to discharging position, a discharging drum, similarly constructed and having teeth similarly mounted and actuated, a slotted shield through which the picker teeth project, and a slotted shield through which the discharging teeth project, substantially as described.

11. In a cotton picking machine, the combination of a casing, a picker drum rotatably mounted therein and comprising at one end a solid drum head and at the other end a ring-shaped drum head, a sleeve inwardly projecting from the solid drum head, a shaft to which said sleeve is rigidly secured, a curved track in the form of a plate secured to one of the walls of the casing and inwardly projecting into the open end of the drum, rock shafts having their ends journaled in the heads of the drums, teeth arranged in rows and rigidly secured to the rock shafts, one of the teeth of each row being inwardly elongated to provide a foot adapted to engage the curved track during a portion of the revolution of the drum and adapted to be released from the track when the teeth are brought to discharging position, a discharging drum, similarly constructed and having teeth similarly mounted and actuated, spur pinions on the ends of the shafts mounting the two drums, a driving spur gear engaging with the two pinions, bevel gearing adapted to actuate the driving spur gear, and a flexible shaft adapted to actuate the bevel gearing, substantially as described.

12. In a cotton picking machine, the combination of a casing, a picker drum rotatably mounted therein and comprising at one end a solid drum head and at the other end a ring-shaped drum head, a sleeve inwardly projecting from the solid drum head, a shaft to which said sleeve is rigidly secured, a curved track in the form of a plate secured to one of the walls of the casing and inwardly projecting into the open end of the drum, rock shafts having their ends journaled in the heads of the drums, teeth arranged in rows and rigidly secured to the rock shafts, one of the teeth of each row being inwardly elongated to provide a foot adapted to engage the curved track during a portion of the revolution of the drum and adapted to be released from the track when the teeth are brought to discharging position, a discharging drum, similarly constructed and having teeth similarly mounted and actuated, a slotted shield through which the picker teeth project, a slotted shield through which the discharging teeth project, spur pinions on the ends of the shafts mounting the two drums, a driving spur gear engaging with the two pinions, bevel gearing adapted to actuate the driving spur gear, and a flexible shaft adapted to actuate the bevel gearing, substantially as described.

STEPHEN S. THOMAS.

Witnesses:
P. H. M. TIPPIN,
J. R. HILL.